(12) United States Patent
Rothkopf et al.

(10) Patent No.: US 12,416,942 B2
(45) Date of Patent: Sep. 16, 2025

(54) BI-STABLE SPRING WITH FLEXIBLE DISPLAY

(71) Applicant: Apple Inc., Cupertino, CA (US)

(72) Inventors: Fletcher R. Rothkopf, Los Altos, CA (US); Derek W. Wright, San Francisco, CA (US); Scott A. Myers, Saratoga, CA (US)

( * ) Notice: Subject to any disclaimer, the term of this patent is extended or adjusted under 35 U.S.C. 154(b) by 0 days.

(21) Appl. No.: 18/778,128

(22) Filed: Jul. 19, 2024

(65) Prior Publication Data

US 2024/0370053 A1 Nov. 7, 2024

Related U.S. Application Data

(63) Continuation of application No. 17/670,002, filed on Feb. 11, 2022, now Pat. No. 12,079,033, which is a continuation of application No. 14/869,867, filed on Sep. 29, 2015, now Pat. No. 11,275,406, which is a continuation of application No. 13/212,045, filed on Aug. 17, 2011, now Pat. No. 9,176,530.

(51) Int. Cl.
| | |
|---|---|
| *G06F 1/16* | (2006.01) |
| *G06F 3/041* | (2006.01) |
| *G06F 3/0488* | (2022.01) |
| *H04N 7/18* | (2006.01) |

(52) U.S. Cl.
CPC ............ *G06F 1/163* (2013.01); *G06F 1/1635* (2013.01); *G06F 1/1643* (2013.01); *G06F 1/1652* (2013.01); *G06F 1/1698* (2013.01); *G06F 3/041* (2013.01); *G06F 3/0488* (2013.01); *H04N 7/18* (2013.01)

(58) Field of Classification Search
CPC ...... G06F 1/163; G06F 1/1635; G06F 1/1643; G06F 1/1652; G06F 1/1698; G06F 3/041; G06F 3/0488; H04N 7/18
See application file for complete search history.

(56) References Cited

U.S. PATENT DOCUMENTS

| | | | |
|---|---|---|---|
| 5,931,764 A | 8/1999 | Freeman et al. | |
| 6,728,166 B2 | 4/2004 | Grupp | |
| 7,618,260 B2 | 11/2009 | Daniel et al. | |
| 8,089,605 B2 | 1/2012 | Nagata et al. | |
| 8,477,464 B2 | 7/2013 | Visser et al. | |
| 8,982,051 B2 | 3/2015 | Rosenfeld et al. | |
| 9,100,493 B1 | 8/2015 | Zhou et al. | |
| 2001/0043513 A1 | 11/2001 | Grupp | |
| 2003/0026171 A1 | 2/2003 | Brewer et al. | |
| 2003/0066308 A1 | 4/2003 | Radley-Smith | |
| 2003/0201999 A1 | 10/2003 | Lin et al. | |
| 2003/0214481 A1 | 11/2003 | Xiong | |
| 2004/0262179 A1 | 12/2004 | Gartrell et al. | |

(Continued)

FOREIGN PATENT DOCUMENTS

| | | | | |
|---|---|---|---|---|
| CA | 2248473 C | * | 7/2000 | ............... G02C 7/02 |
| CN | 101782804 A | * | 7/2010 | ............. G06F 1/163 |

(Continued)

*Primary Examiner* — Tracy Y. Li
(74) *Attorney, Agent, or Firm* — Jinie M. Guihan

(57) ABSTRACT

A wearable accessory device is disclosed. The wearable accessory device includes a flexible display coupled to a bi-stable spring. Coupling the display to the bi-stable spring allows the accessory device to be easily worn in a number of convenient locations.

20 Claims, 11 Drawing Sheets

(56) References Cited

U.S. PATENT DOCUMENTS

| | | |
|---|---|---|
| 2005/0174302 A1 | 8/2005 | Ishii |
| 2005/0285963 A1 | 12/2005 | Misawa et al. |
| 2006/0061555 A1 | 3/2006 | Mullen |
| 2006/0121963 A1 | 6/2006 | Gartrell et al. |
| 2007/0158376 A1 | 7/2007 | Radley-Smith |
| 2007/0247439 A1 * | 10/2007 | Daniel ............... G06F 1/1694 345/173 |
| 2008/0166519 A1 | 7/2008 | Leung |
| 2008/0258917 A1 | 10/2008 | Boyd et al. |
| 2008/0273040 A1 | 11/2008 | Dryer et al. |
| 2008/0291225 A1 | 11/2008 | Arneson |
| 2008/0309640 A1 | 12/2008 | Hong |
| 2008/0310094 A1 | 12/2008 | Burns |
| 2009/0122036 A1 | 5/2009 | Miles |
| 2009/0132093 A1 | 5/2009 | Arneson et al. |
| 2009/0251888 A1 | 10/2009 | Douglas |
| 2010/0097561 A1 | 4/2010 | Nagata et al. |
| 2010/0117972 A1 | 5/2010 | Zhao et al. |
| 2010/0117975 A1 | 5/2010 | Cho |
| 2010/0134503 A1 | 6/2010 | Sampsell et al. |
| 2010/0164888 A1 | 7/2010 | Okumura et al. |
| 2010/0208417 A1 | 8/2010 | Visser et al. |
| 2010/0242274 A1 | 9/2010 | Rosenfeld et al. |
| 2010/0245246 A1 | 9/2010 | Rosenfeld et al. |
| 2010/0302179 A1 | 12/2010 | Ahn et al. |
| 2010/0317409 A1 | 12/2010 | Jiang et al. |
| 2011/0007042 A1 | 1/2011 | Miyaguchi |
| 2011/0037907 A1 | 2/2011 | Miles |
| 2011/0043431 A1 | 2/2011 | Reinhold et al. |
| 2011/0054565 A1 | 3/2011 | Wacnik et al. |
| 2011/0109567 A1 | 5/2011 | Kim |
| 2011/0134145 A1 | 6/2011 | Moriwaki |
| 2011/0148797 A1 | 6/2011 | Huitema et al. |
| 2011/0183722 A1 | 7/2011 | Vartanian |
| 2011/0187681 A1 | 8/2011 | Kim et al. |
| 2011/0199389 A1 | 8/2011 | Lu et al. |
| 2011/0215934 A1 | 9/2011 | Boyd et al. |
| 2011/0227822 A1 * | 9/2011 | Shai ..................... G06F 1/1647 345/156 |
| 2011/0227855 A1 | 9/2011 | Kim et al. |
| 2011/0252606 A1 | 10/2011 | Rothbaum et al. |
| 2011/0261002 A1 | 10/2011 | Verthein |
| 2011/0262055 A1 | 10/2011 | De Haan et al. |
| 2011/0265564 A1 | 11/2011 | Acar et al. |
| 2011/0265565 A1 | 11/2011 | Acar et al. |
| 2011/0265566 A1 | 11/2011 | Acar et al. |
| 2011/0298750 A1 | 12/2011 | Wang et al. |
| 2012/0069232 A1 | 3/2012 | Chui et al. |
| 2012/0115422 A1 | 5/2012 | Tziortzis et al. |
| 2012/0242588 A1 | 9/2012 | Myers et al. |
| 2012/0242592 A1 | 9/2012 | Rothkopf et al. |
| 2012/0243151 A1 | 9/2012 | Lynch |
| 2012/0314400 A1 | 12/2012 | Bohn et al. |
| 2012/0314546 A1 | 12/2012 | Brewer et al. |
| 2015/0229750 A1 | 8/2015 | Zhou et al. |
| 2016/0147261 A1 | 5/2016 | Bohn et al. |

FOREIGN PATENT DOCUMENTS

| | | | |
|---|---|---|---|
| CN | 102782637 A * | 11/2012 | ........ H04M 1/72469 |
| EP | 0689122 A1 * | 12/1995 | ........... G06F 3/0338 |
| EP | 1158375 A1 | 11/2001 | |
| EP | 1010037 B1 | 5/2003 | |
| EP | 2294937 A2 | 3/2011 | |
| JP | 2005250442 A | 9/2005 | |
| WO | 00/25193 A3 | 5/2000 | |
| WO | 2001088636 A1 | 11/2001 | |
| WO | 2008085818 A1 | 7/2008 | |

* cited by examiner

BI-STABLE SPRING WITH FLEXIBLE DISPLAY

CROSS-REFERENCE TO RELATED APPLICATIONS

This application is a continuation of U.S. patent application Ser. No. 17/670,002, filed Feb. 11, 2022, which is a continuation of U.S. patent application Ser. No. 14/869,867, filed Sep. 29, 2015, now U.S. Pat. No. 11,275,406, which is a continuation of U.S. patent application Ser. No. 13/212,045, filed Aug. 17, 2011, now U.S. Pat. No. 9,176,530, which are hereby incorporated by reference herein in their entireties.

FIELD

The described embodiments relate generally to portable electronic devices. In particular methods for expanding the functionality of electronic devices are disclosed.

RELATED ART

Bi-stable springs have two equilibrium positions. This allows a device with a bi-stable spring to assume two distinct configurations. The most recent widespread use of such a device was the slap bracelet, also called the slap wrap. The slap bracelet consists of layered flexible steel bands sealed within a fabric cover. Typical slap bracelets are roughly one inch in width by nine inches in length. In a first equilibrium position they can be flat. The second equilibrium is typically reached by slapping the flat embodiment across the wrist, at which point the bracelet curls around the wrist and stays relatively secure in a roughly circular position. The slap bracelet has been used primarily as a decorative bracelet; however, other uses have included for example keeping a pant leg away from a bike chain, or even using a slap bracelet covered with reflective tape for providing increased visibility for pedestrians and bikers at night. Perhaps most usefully it is quite easy to wrap around a wrist or leg, and stays conveniently in place.

Conversely conventional accessories for electronic devices do not tend to be easily wearable. They include various clips or may even rest precariously on an ear. In some cases accessory devices may even have to sit in a pant or coat pocket. Therefore an apparatus that capitalizes on the easily wearable nature of a bi-stable spring is desired.

SUMMARY

This paper describes various embodiments that relate to an apparatus, method, and apparatus with a display and associated electronics.

A wearable video device arranged to be worn by an end-user is disclosed. The wearable video device includes the following: (1) a flexible substrate having a flat state and a curled state; and (2) a flexible display disposed upon a first surface of the flexible substrate, where in the curled state the flexible substrate conforms to an appendage of the end-user. The flexible substrate also includes an electronic module in communication with the flexible display, the electronic module providing information to the display, at least a part of which is presented in real time for presentation by the display.

A method for passing information between an accessory device disposed on one surface of a bi-stable spring substrate and a portable electronic device is disclosed. The accessory device includes a flexible display arranged to present a first set of visual information. The portable electronic device has a portable electronic device display arranged to present a second set of visual information. The method includes the following steps: (1) determining whether the accessory device is being worn by an end-user where the determining is accomplished by at least one sensor on the accessory device; (2) when it determined the accessory device is being worn by the end user, establishing a communication channel between the accessory device and the portable electronic device where the communication channel is arranged to provide a bi-directional communication link between the flexible display and the portable electronic device; (3) passing information between the portable electronic device and the accessory device by way of the bi-directional communication link, where at least a portion of the passed information is presented by the flexible display as the first set of visual information; and (4) displaying the first set of visual information by the flexible display.

A slap bracelet configured to display information wirelessly transmitted from a portable electronic device is disclosed. The slap bracelet includes at least the following components: (1) a communication link, allowing two-way communication between the slap bracelet and the portable electronic device; (2) a flexible display disposed over a portion of a first surface of the slap bracelet; (3) a touch sensitive user interface disposed over the top of the flexible display; and (4) an electronic module disposed on one end of the first surface of the slap bracelet. Information generated on either device can be displayed on either the host device display or the flexible display.

A non-transitory computer readable medium for storing computer instructions executed by a processor in a portable electronic device for controlling a flexible accessory device mounted on a bi-stable spring substrate in wireless communication with the portable electronic device is disclosed. The non-transitory computer readable medium includes the following: computer code for establishing a communication channel between the flexible accessory device and the portable electronic device; computer code for receiving a user input on a first user interface built into the portable electronic device; computer code for interpreting the user input with the portable electronic device processor; computer code for sending display data across the communication channel; and computer code for displaying the display data on a flexible accessory device display.

Other aspects and advantages of the invention will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Figure 1:
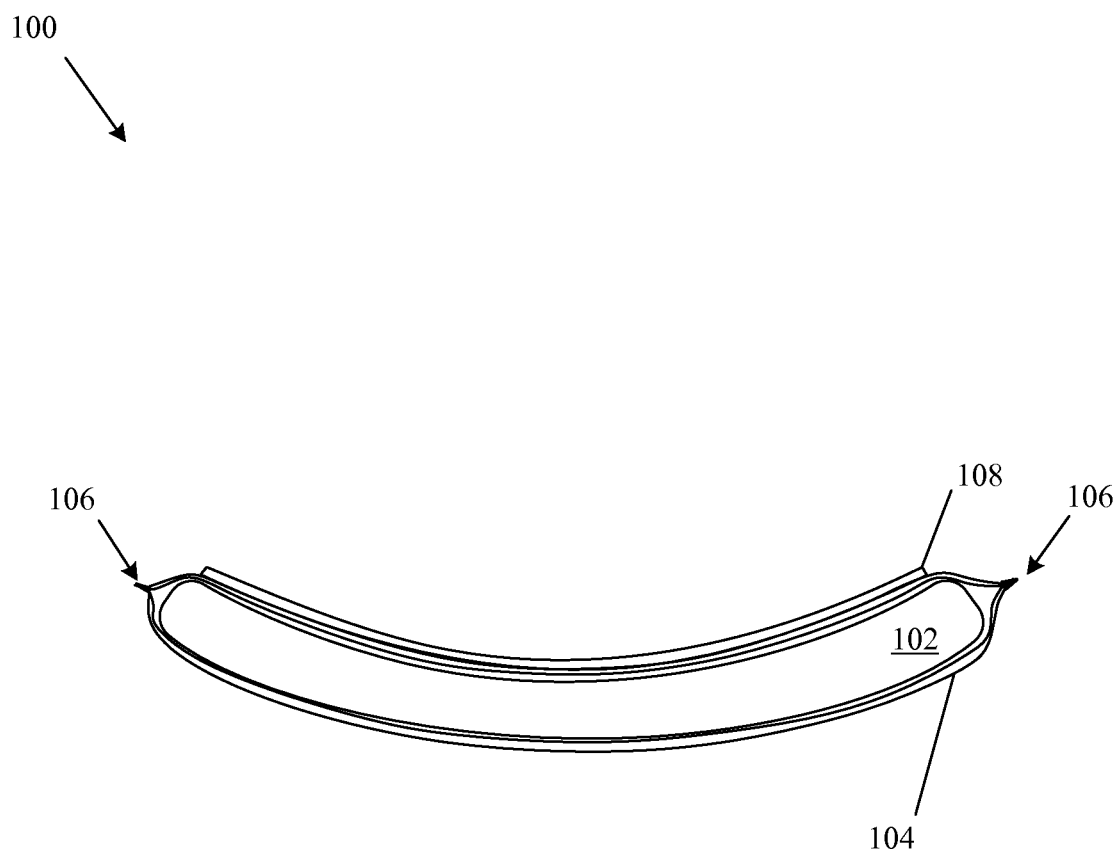
FIG. 1 shows a conventional slap bracelet with a flexible display fastened to one surface.

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

Accessories for portable computing devices have become quite common. Today typical portable electronic device accessories are passive in nature, the majority of which simply function to protect the screen, or perhaps support the device in some specific orientation. Although some devices such as Bluetooth headsets and keyboards do have limited interactive capability the majority of accessories are limited to more basic tasks. These accessories can be improved by including at least some of the following features: (1) a power source; (2) a communications protocol; (3) an input method; and (4) an independent storage medium.

An accessory that takes a more active interaction role with the portable computing device would also typically need a power source to drive it. In some embodiments, a battery can be incorporated within the body of the accessory. The battery can take many forms. For example, the battery can be distributed in nature by which it is meant that portions of the battery can be placed in disparate locations in the accessory. In another example, the battery can be replaceable or otherwise accessible by the user. The operating time of a built in battery can be augmented by the addition of an auxiliary power supply such as a solar panel array to the accessory. A solar panel array spread across a surface of the accessory device can lengthen the amount of time the accessory device could be operated between recharging. A battery can also allow for the accessory device to continue nominal operations after the portable electronic device has been turned off or a communications channel between the two devices has been secured, especially with the inclusion of a small amount of storage space. For example, a simple screen saver could be displayed with an accessory device that includes a display. In another embodiment a short document or email could be reviewed. Other sources of power could include a kinetic power source similar to those found on some wristwatches. An accessory device designed to be worn on a leg or arm could greatly benefit from this sort of power generation, and could lengthen the amount of time between charging.

Active communication between an accessory and a portable electronic device can be accomplished wirelessly. For example, a wireless data connection such as the 5 GHz 802.11n protocol can provide sufficient data transmission bandwidth to transmit a high quality video stream. The wireless protocol allows for robust communication between the two devices. The accessory device could also connect to the portable electronic device via Bluetooth. While it might not carry the same amount of data it may be preferable for situations in which only small amounts of data are being sent back and forth.

In the simplest embodiment of the described embodiments a flexible display can be added to a conventionally designed slap bracelet, with the addition of a battery and a minimal number of electronic components. In FIG. 1 a cross section of a conventional slap bracelet 100 with an overlaid display is shown. A thin steel bi-stable spring 102 is covered by fabric covering 104. The spring steel making up the bi-stable spring should be at least 0.006 inches thick. Fabric covering 104 is heat sealed around bi-stable spring 102 at sealing positions 106. A thin, flexible display 108 can then be overlaid with an adhesive on one surface of the slap bracelet. A printed circuit board with the aforementioned electronics (not shown) could be mounted at one end of slap bracelet 100, so that the other end of the slap bracelet could completely cover the electronics module while a user wears it. Although mounting the described embodiments to a slap bracelet with a bi-stable spring does allow a convenient attachment method, it should be noted that the described embodiments could be mounted on any flexible substrate. For example a fabric substrate could be used that simply included snaps or velcro in order to secure itself around a human appendage.

Figure 2A:
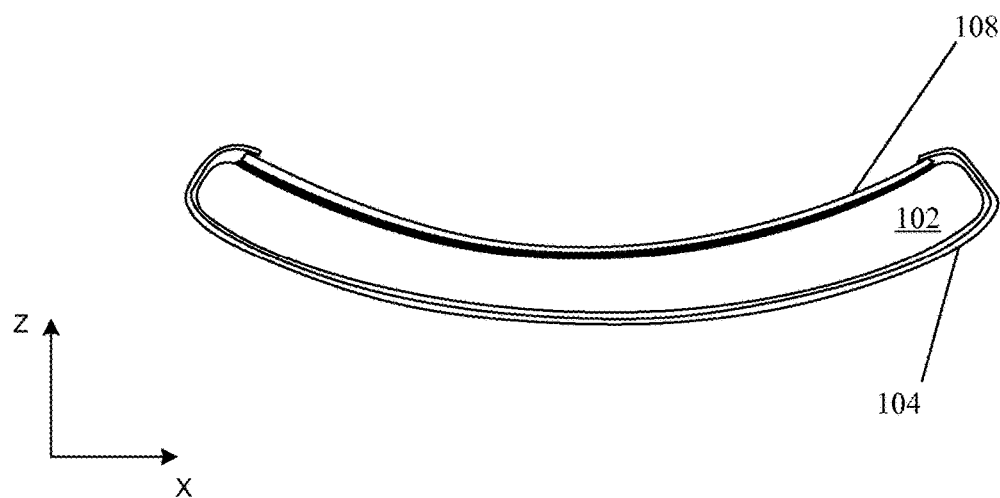
FIGS. 2A and 2B show cross sectional views of an accessory device in accordance with the described embodiments.
Figure 2B:
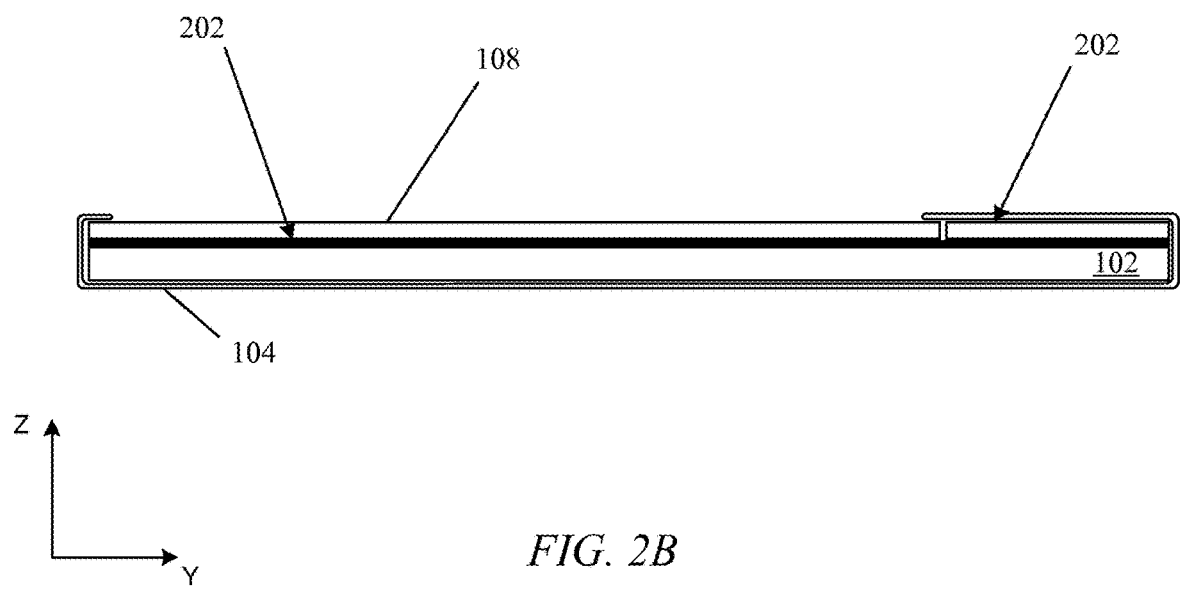

One problem with the design of the conventionally designed slap bracelet was that the fabric covering would occasionally separate at the heat sealed portions. Since the described embodiment will house valuable electronics, a manufacturer can create a more robust design. FIG. 2A shows a cross sectional view of a robust accessory device 200 in which flexible display 108 is adhered directly to one side of bi-stable spring 102. Fabric covering 104 can then wrap all the way around the edge of bi-stable spring 102, and provide a robust frame for flexible display 108. It should be noted that although fabric similar to the conventional slap bracelet can be used, a thicker more cushioned fabric can also be utilized to increase user comfort. FIG. 2B shows another cross sectional view of accessory device 200. In this view flexible electronic module 202 is depicted at one end of accessory device 200, adhered directly to the surface of bi-stable spring 102 at one end of accessory device 200. Since the cross section of a slap bracelet switches from convex to concave upon changing states it is important to note that the flexible electronic module 202 must contain components that are flexible in nature and resistant to fatigue. Flexible electronic module 202 can include a flexible printed circuit board with at least one wireless communications antenna, integrated circuits for driving the display, along with data and power connectors.

With the aforementioned devices housed within flexible electronic module 202 a communication channel can be established and maintained with a portable electronic device. The portable electronic device and bi-stable spring mounted accessory device can form a cooperative electronic system in which the electronic devices can communicate with each other. This system can be further enhanced by the addition of additional sensors. For example in an accessory configuration which includes a touch screen overlaid on top of flexible display 108, the end user could respond to alerts sent from the portable electronic device and even direct the operations of the portable electronic device to an extent limited by the accessory device user interface. With a touch screen user input a user can accomplish a number of different tasks including adjusting the order of a current playlist, and reviewing a list of recent phone calls. A response to a current text message can even be managed given a simple virtual keyboard configuration across the face of the flexible display 108.

Figure 3A:
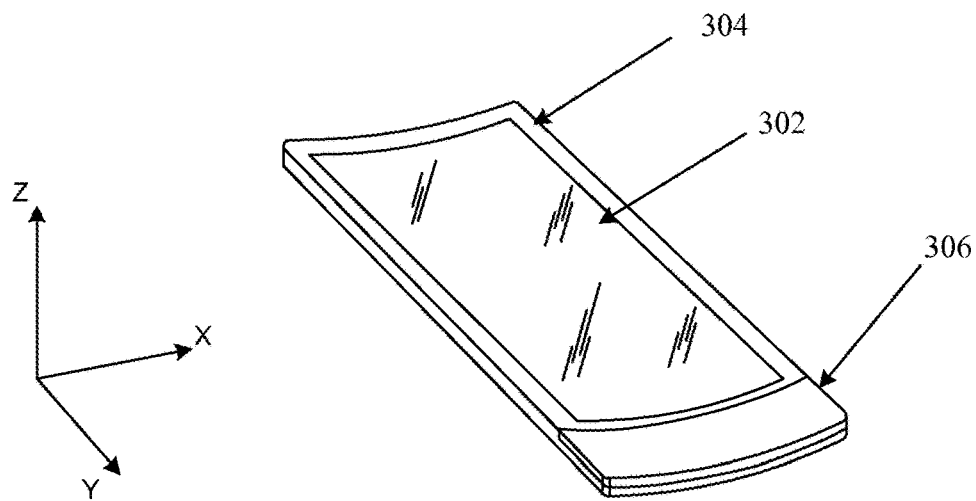
FIGS. 3A and 3B show perspective views of an accessory device in accordance with the described embodiments.
Figure 3B:
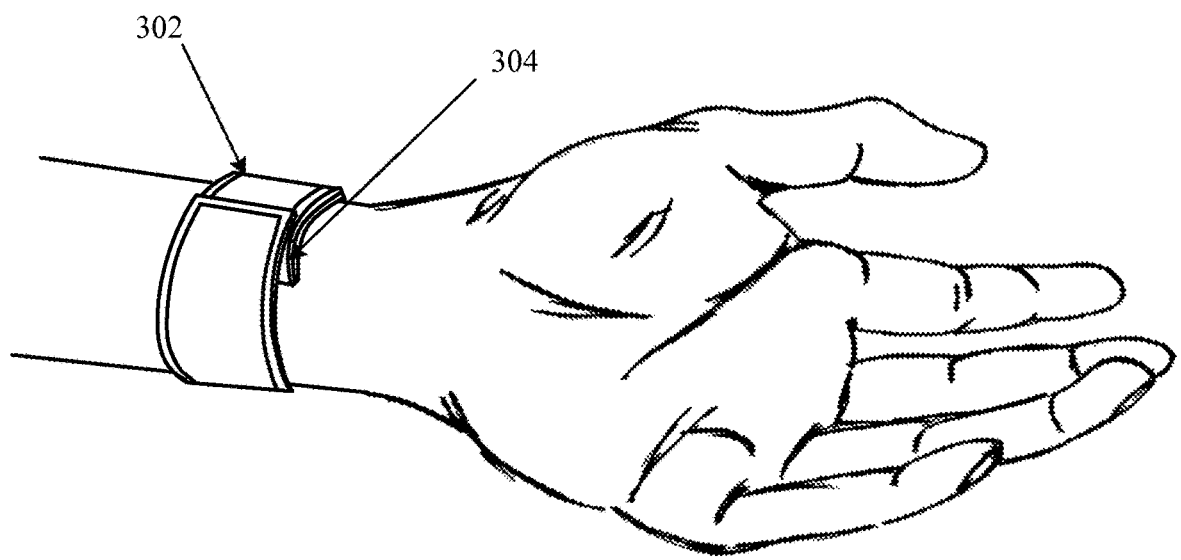

FIGS. 3A and 3B show perspective views of both bi-stable spring states of accessory device 300 in accordance with the described embodiments. In FIG. 3A the bi-stable spring is arranged in a flat state. Flexible display 302 is overlaid on the surface of the accessory device with a thin border area 304 securing and protecting the edges of flexible display 302. Flexible electronic module 306 is also shown located on one end of accessory device 300. In FIG. 3B accessory device 300 is in a curled state and can be seen wrapped around the arm of a user. Accessory device 300 is wrapped around an arm in a way such that the flexible electronic module 306 is completely obscured by the wrap around flexible display 302, leaving only a thin border to interrupt an otherwise continuous screen around the wrist. When accessory device 300 switches from the flat state shown in FIG. 3A to assume the curled state shown in FIG. 3B the bi-stable spring switches from a concave shape to a convex shape, bending both flexible display 302 and flexible electronic module 306. Flexible electronic module 306 can be configured with a strain gauge to determine when changes in state occur. The determining done by the strain gauge allows accessory device 300 to adjust a user interface displayed on flexible display 302 from one layout to another based upon the state of the accessory device. It should also be noted that even though accessory device 300 is shown as a relatively narrow band around a user's wrist, the accessory device could be configured to be much wider. As the accessory device widens its potential for functionality also increases. At a width of a few inches the display can function to temporarily view and manipulate the screen of the portable electronic device it is in communication with. This might be desirable when the portable electronic device is stored in an inconvenient location such as a cargo pocket, or the bottom of a backpack. A larger display is also more desirable for map viewing. The arm mounted location makes map viewing a desirable function for such a device, as a traveler or explorer can easily reference the information with a flick of the wrist while exploring. A wider overall device width also allows for a larger flexible electronic module 306. This allows more space for a larger battery, and additional sensors which will be discussed later.

Figure 4A:
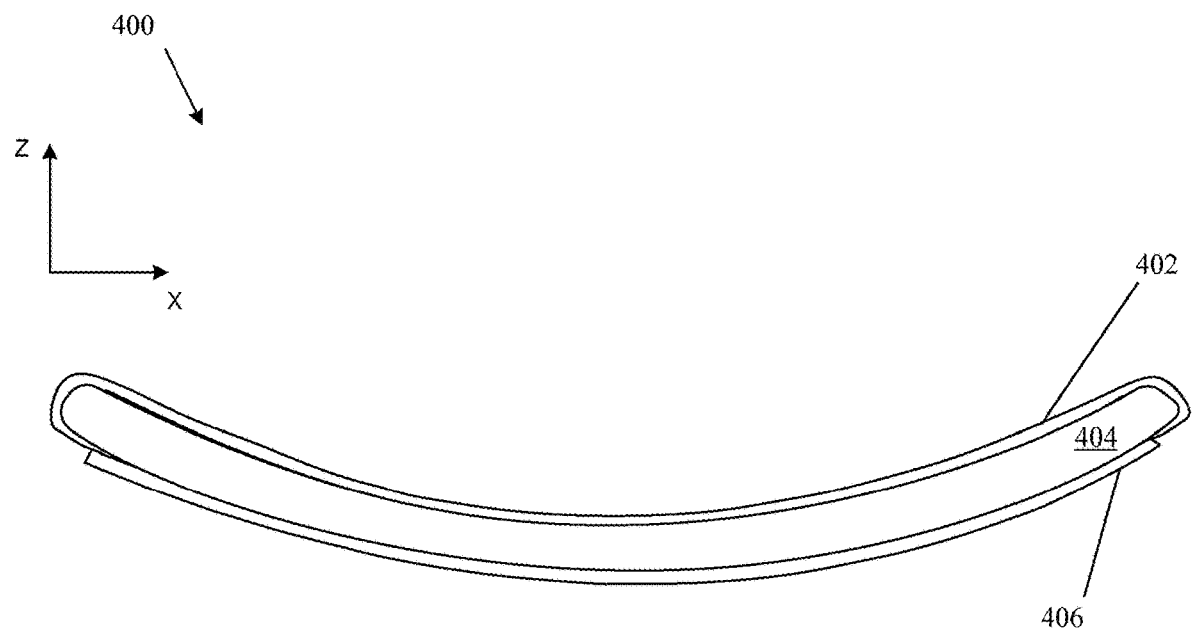
FIGS. 4A and 4B show cross sectional views of an accessory device with an edge to edge flexible display in accordance with the described embodiments.
Figure 4B:
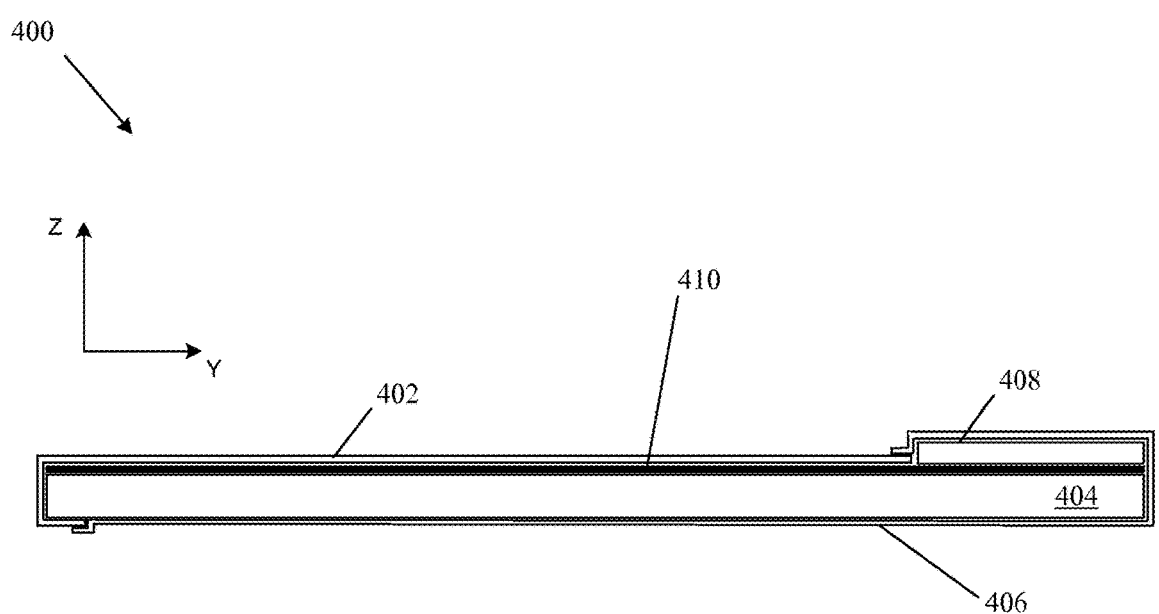

FIGS. 4A and 4B show cross sectional views of an edge to edge flexible display 402 integrated into accessory device 400. In FIG. 4A flexible display 402 is shown wrapping around the edges of bi-stable spring 404. Fabric covering 406 covers the bottom of bi-stable spring 404 and also covers the edges of flexible display 402. Modern flexible display technology can be built particularly robustly and flexible display 402 can withstand repeated stresses put upon it by bi-stable spring 404 and day to day wear. The result is a strong edge to edge screen which has a number of advantages over the previously described embodiment. An increase in screen size is obtained in this configuration. Edge lighting is now also possible. For example a user could configure blue bordered edge lighting to surround the screen. Blinking lights displayed on the edges of the display can act as an event alert to a user that might be more effective since when the display is wrist or arm mounted it is the edge that generally is closest to the user, not the front. In yet another use an accessory device owner riding a bike could mount it on an arm or leg with some kind of bright pattern running along the screen for increased visibility. FIG. 4B shows a cross sectional view of accessory device 400 showing how flexible display 402 and flexible electronic module 408 are attached to bi-stable spring 404 with an adhesive layer 410. Also shown is fabric covering 406 which covers flexible electronic module 408 and secures the portion of flexible display 402 which extends over one end of bi-stable spring 404.

Figure 5A:
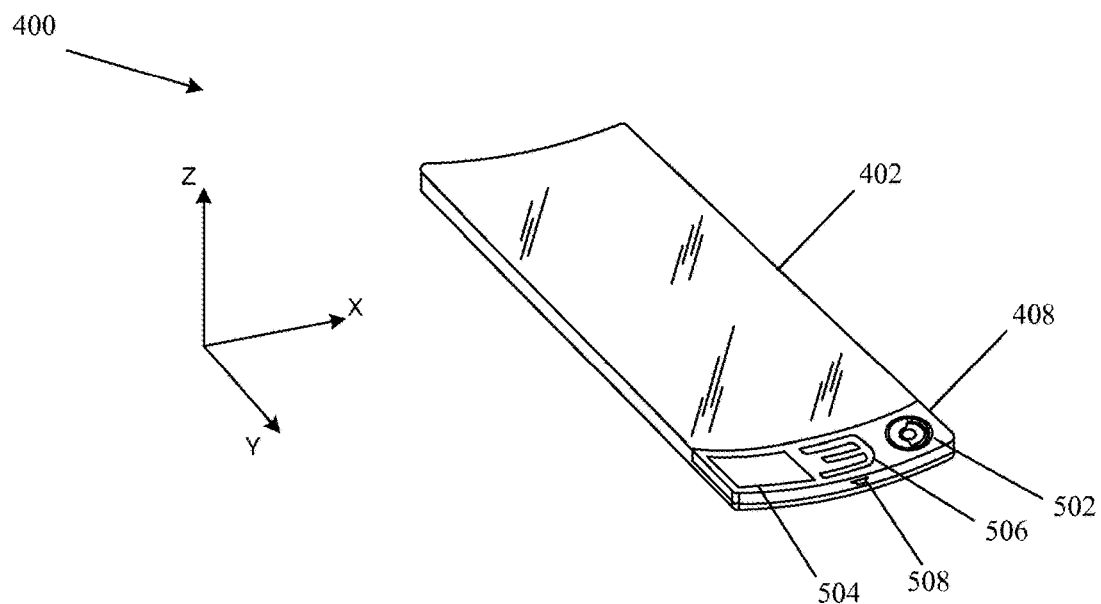
FIGS. 5A and 5B show perspective views of an accessory device with an edge to edge flexible display in accordance with the described embodiments.
Figure 5B:
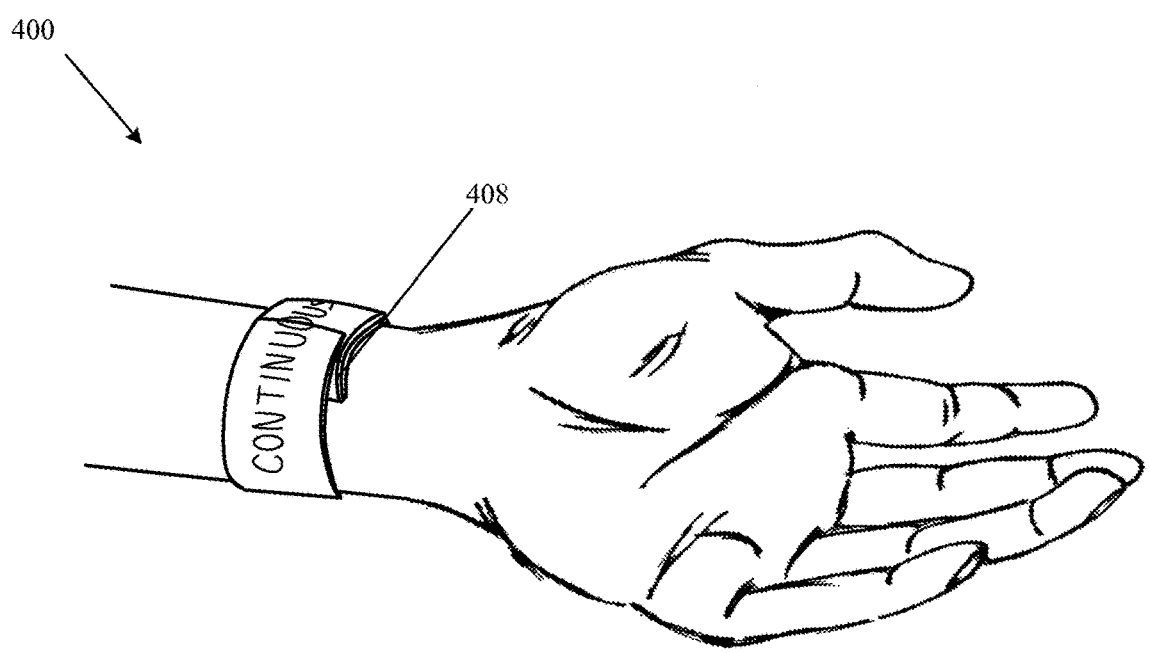

FIGS. 5A, and 5B show perspective views of both bi-stable spring states of accessory device 400 in accordance with the described embodiments. FIG. 5A shows a view of accessory device 400 and how it appears with the edge to edge display described under FIG. 4. In this flat state the accessory device can also be operated. The flat state has the advantage of showing more of flexible display 402 at once, and therefore might be a preferable state for activities such as parameter initialization or for establishing connections between it and another portable electronic device. The accessory device can contain a sensor which alerts the device as to which state it is in and then changes the user interface to optimize it for that state, as described under FIG. 3B. Individual elements of flexible electronic module 408 are shown on the surface of flexible electronic module 408 for explanatory purposes. Kinetic energy gathering device 502 is shown on the right side of flexible electronic module 408. One of the advantages of having the accessory device on an extremity is that it is an ideal location for gathering kinetic energy. The simple motion of a user's arm or leg allows the accessory device to harness some of that energy for charging battery 504. Antenna 506 is for establishing and maintaining the connection between accessory device 400 and the portable electronic device. The antenna can be configured to pass data over WiFi, Bluetooth or any other suitable wireless protocol. Connector 508 allows accessory device 400 to be connected by wire to another electronic device for activities such as charging, performing firmware updates, or even for reconfiguring the device. Connector 508 can consist of a plug as shown, or could have a small tab that extended from the flexible electronic module for easily plugging into a computer port.

FIG. 5B shows accessory device 400 in its curled state, attached to a user's wrist. As can be seen the display wraps completely around the wrist in this state creating an uninterrupted screen. One sensor that could be added to the components illustrated is an inertial orientation sensor, such as a gyroscope, or accelerometer (not shown). By including an inertial orientation sensor displayed information could be arranged so that it always faces up, or directly towards the user. This conveniently allows a user to continue viewing information on the accessory device while maneuvering the extremity it is located on. In a power saving mode the inertial orientation sensor can be configured to only activate the display when the accessory device is rotated into a specific viewing orientation, thereby saving the user the hassle of having to push a button to activate the screen while still allowing for the power savings of a standby mode. In another aspect of the power saving mode the inertial orientation sensor could generate power savings by deactivating portions of the screen oriented away from the user. Because the flexible display technology uses an active matrix light emitting diode (AMOLED) display the deactivation of unused portions of the display helps significantly. This is due to the fact that AMOLED displays can activate individual pixels, and save energy when the number of illuminated pixels is reduced.

Figure 5C:
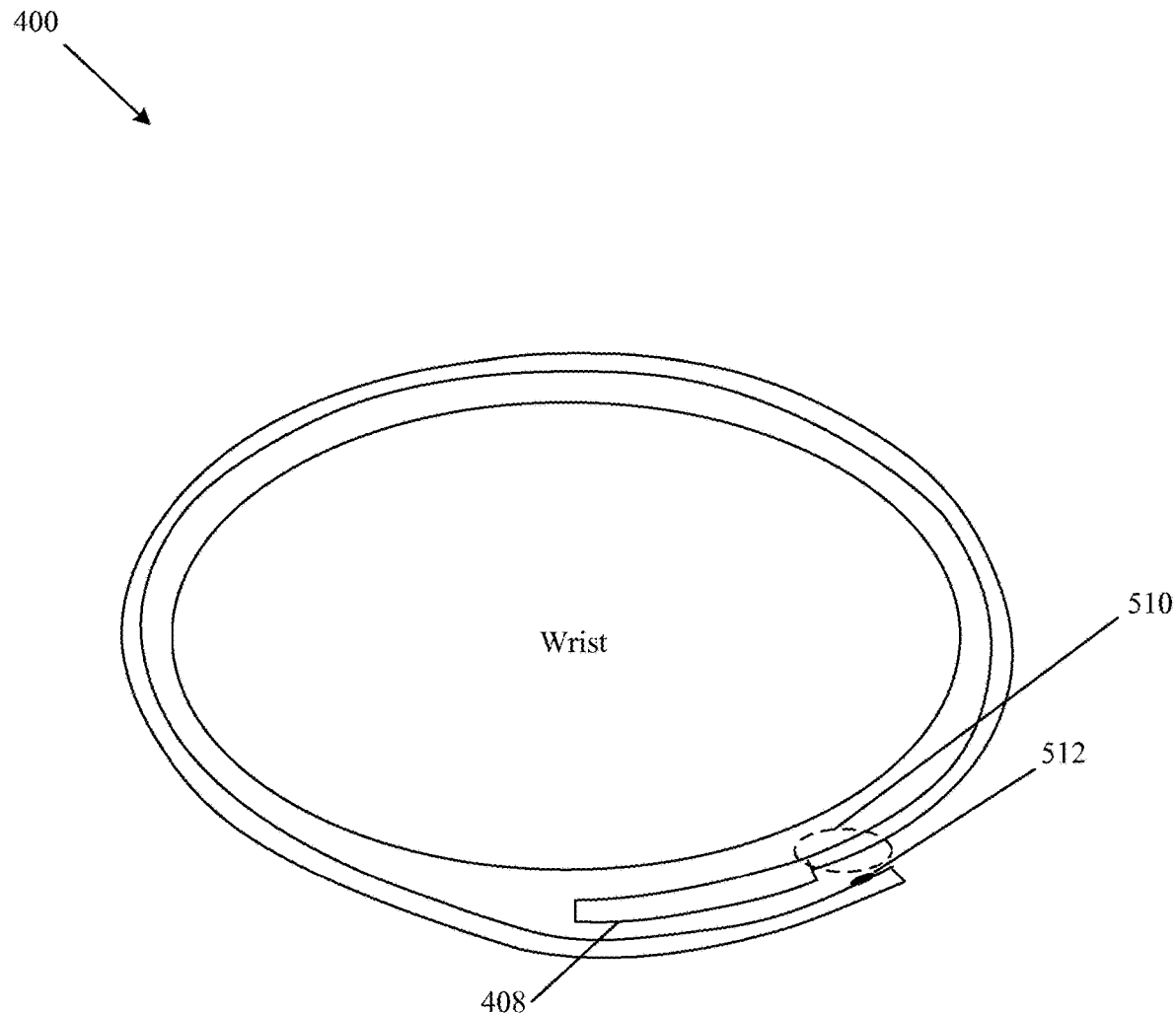
FIG. 5C shows a cross sectional view of an accessory device with an end detection sensor in accordance with the described embodiments.

One challenge to overcome when making a continuous display that wraps all the way around an arm or leg is that these appendages invariably come in different sizes. FIG. 5C illustrates one solution to this challenge. By including an end-detection sensor on accessory device 400 the location of the end of the accessory device can be known, and the accessory device can properly configure the screen to deactivate covered portion 510 of the screen. In an embodiment with a touch screen sensor the touch screen itself can act as the end detection sensor. Capacitive elements 512 can be added to the end of accessory device 400 as illustrated, and when the touch screen is activate the touch screen can report the location of the capacitive elements and deactivate the covered portion of the screen. In this way the accessory device can be wrapped tightly around the wrist of any size user with no display discontinuity problems. A user can even switch between arm and leg mounting with out having to go through a time consuming recalibration process each time. As referenced in FIG. 5B the resulting deactivated portions have the additional advantage of saving accessory device power.

Figure 6A:
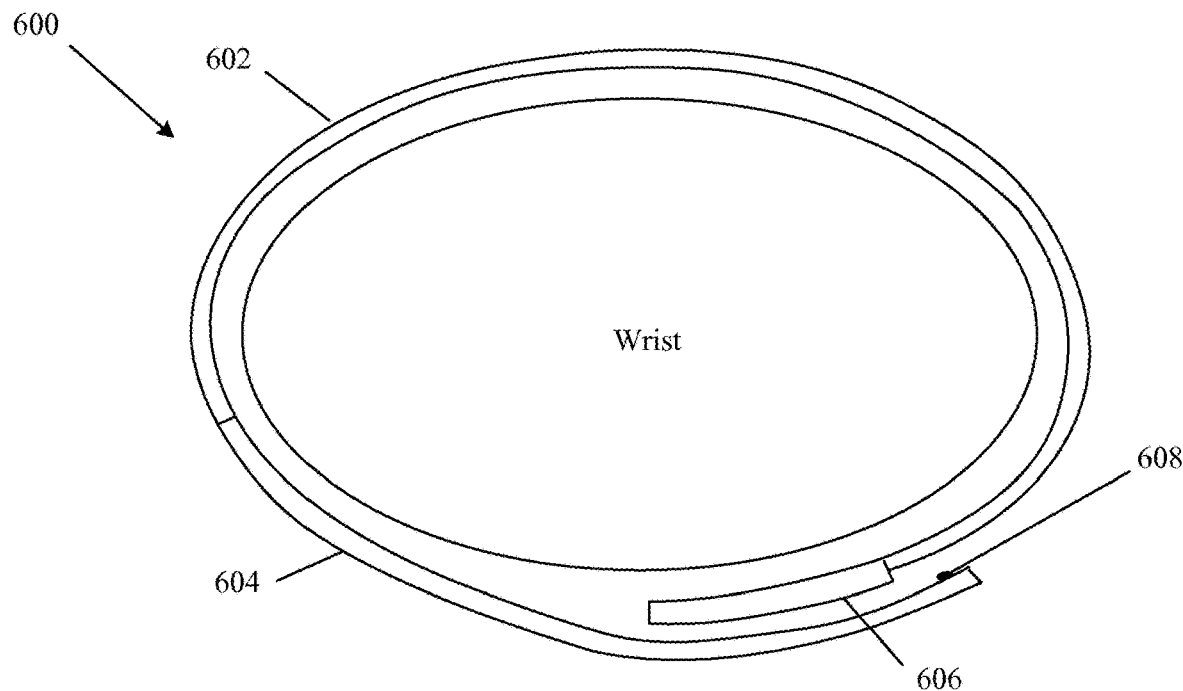
FIGS. 6A and 6B show an accessory device with ambient light energy collectors disposed on an outer surface of the accessory device, in accordance with the described embodiments.
Figure 6B:
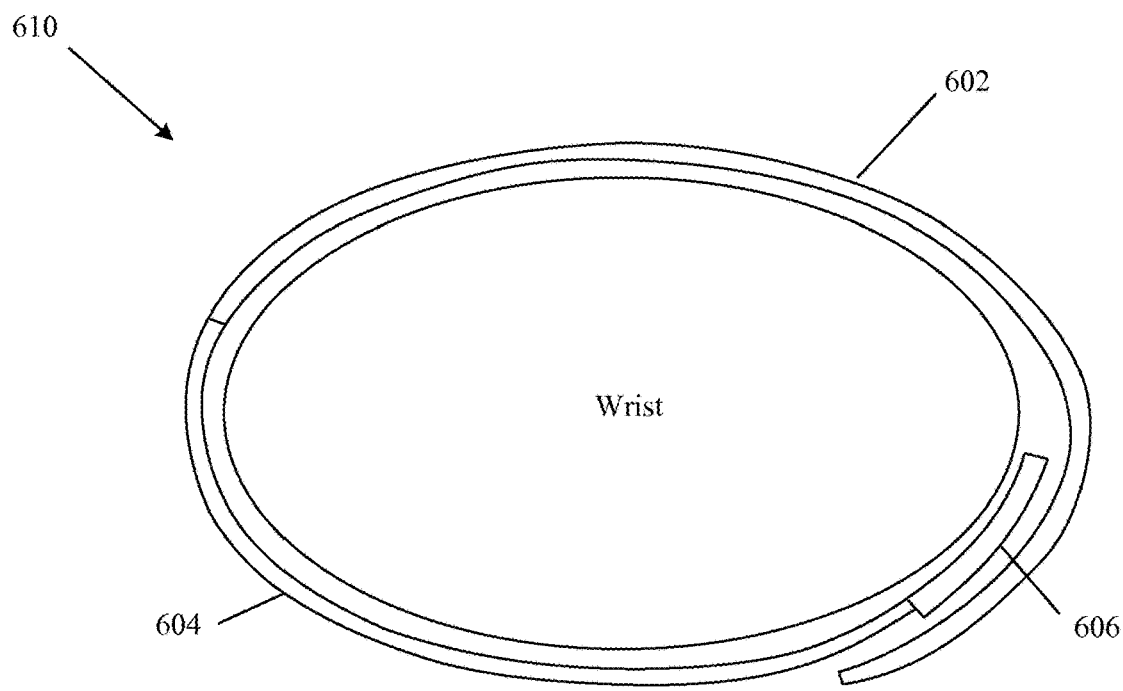

FIGS. 6A and 6B show a configuration in which ambient light energy collectors replace a portion of the screen. While in the illustrated configurations this precludes a continuous wrap around screen it has the advantage of being able to provide additional power to the accessory device. In fact a device worn on the body is particularly well suited for gathering ambient light energy since it tends to be exposed and frequently oriented towards the sun or other strong light sources. FIG. 6A shows one embodiment where flexible display 602 only wraps around part of the arm. Starting at a rear portion of accessory device 600 a portion of flexible display 602 is replaced by ambient light energy collectors 604. This configuration uses end detection sensors 606 to deactivate covered portions of flexible display 602 since ambient light energy collectors 604 may cover a portion of flexible display 602. FIG. 6B shows an alternate embodiment 610 in which ambient light energy collectors 604 are arranged next to flexible electronic module 608. This configuration prevents ambient light energy collectors 604 from covering any of flexible display 602 in a curled state; however, in a flat state having flexible display 602 separated from flexible electronic module 608 by ambient light energy collectors 604 might not be desirable since in some embodiments flexible electronic module 608 can have physical buttons a user might want to access in conjunction with flexible display 602. In yet another ambient light energy collector embodiment the ambient light energy collectors can be arranged on one or both edges of flexible display 602. In this way a continuous display can still be achieved while maintaining the benefit of receiving ambient light energy.

Figure 7A:
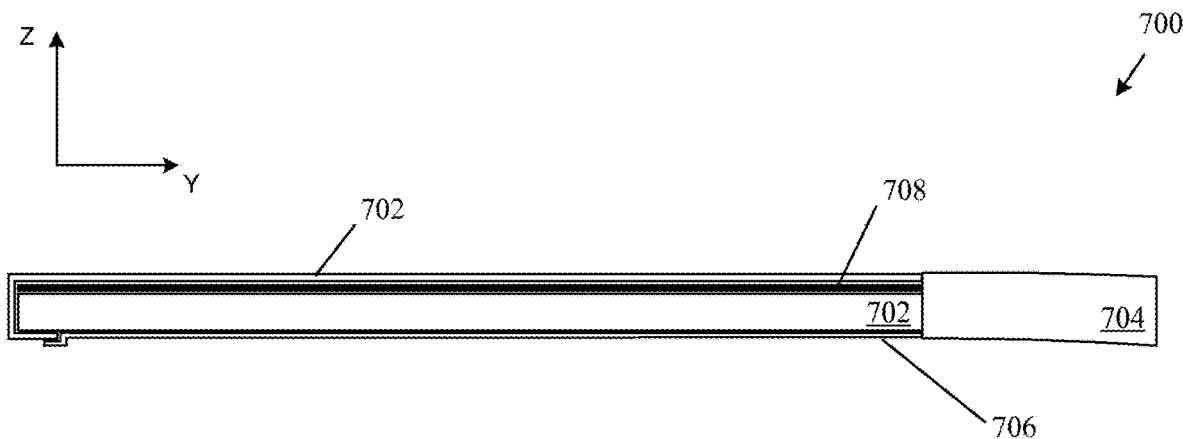
FIGS. 7A and 7B show an alternative embodiment in which the electronic module is rigid.
Figure 7B:
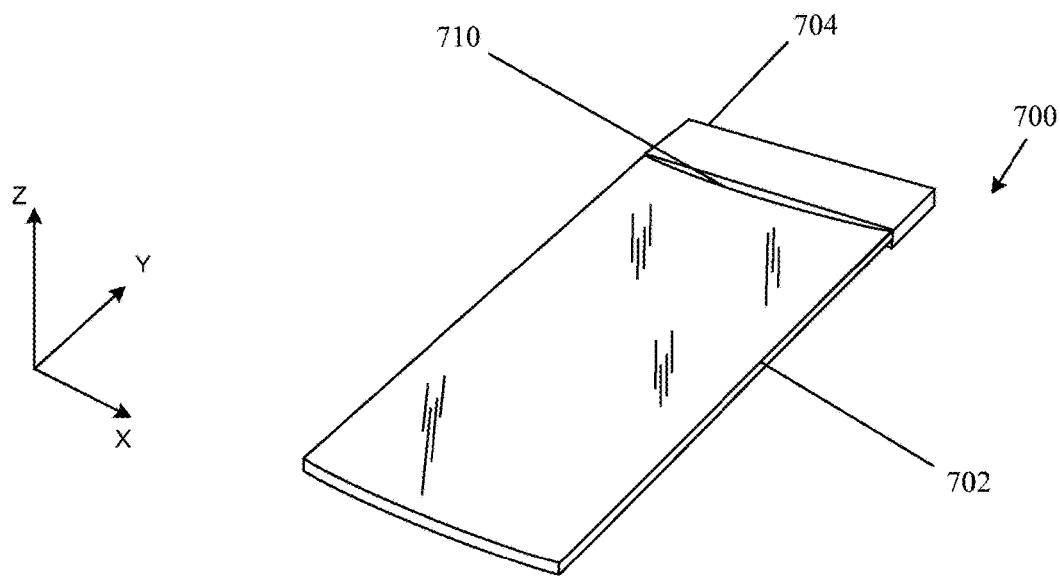

FIG. 7A shows an alternative configuration 700 in which the electronic module is rigid. In FIG. 7A bi-stable spring 702 is shown attached to rigid electronic module 704. Rigid electronic module 704 can include a slight curve to it as illustrated so that it conforms to a wrist or ankle more easily when in a curled state. Flexible display screen 706 is still adhered to bi-stable spring 702 by adhesive layer 708. This configuration has a number of advantages over the previously described embodiments. First, by removing electronic module 704 from the bi-stable spring the electronic module can be rigid. A rigid module will generally not be subjected to the same fatigue stresses as a flexible electronic module would be and the casing can be built a little more solidly as it doesn't have to flex or bend with the bi-stable spring. Second, rigid electronic module 704 can be taller without changing the overall form factor of the device, as it is not stacked on top of the device, and does not curl upwards with the curve of the bi-stable spring. Finally, the circuit board design can be easier as flexible regions need not be designed around when placing components. FIG. 7B shows a perspective view of alternative configuration 700. The figure shows how one end of bi-stable spring 702 is anchored to rigid electronic module 704 at intersection 710. In this configuration bi-stable spring 702 can still bend and flex, even though the attached end of bi-stable spring 702 might be somewhat less flexible near the intersection as a result.

Figure 8:
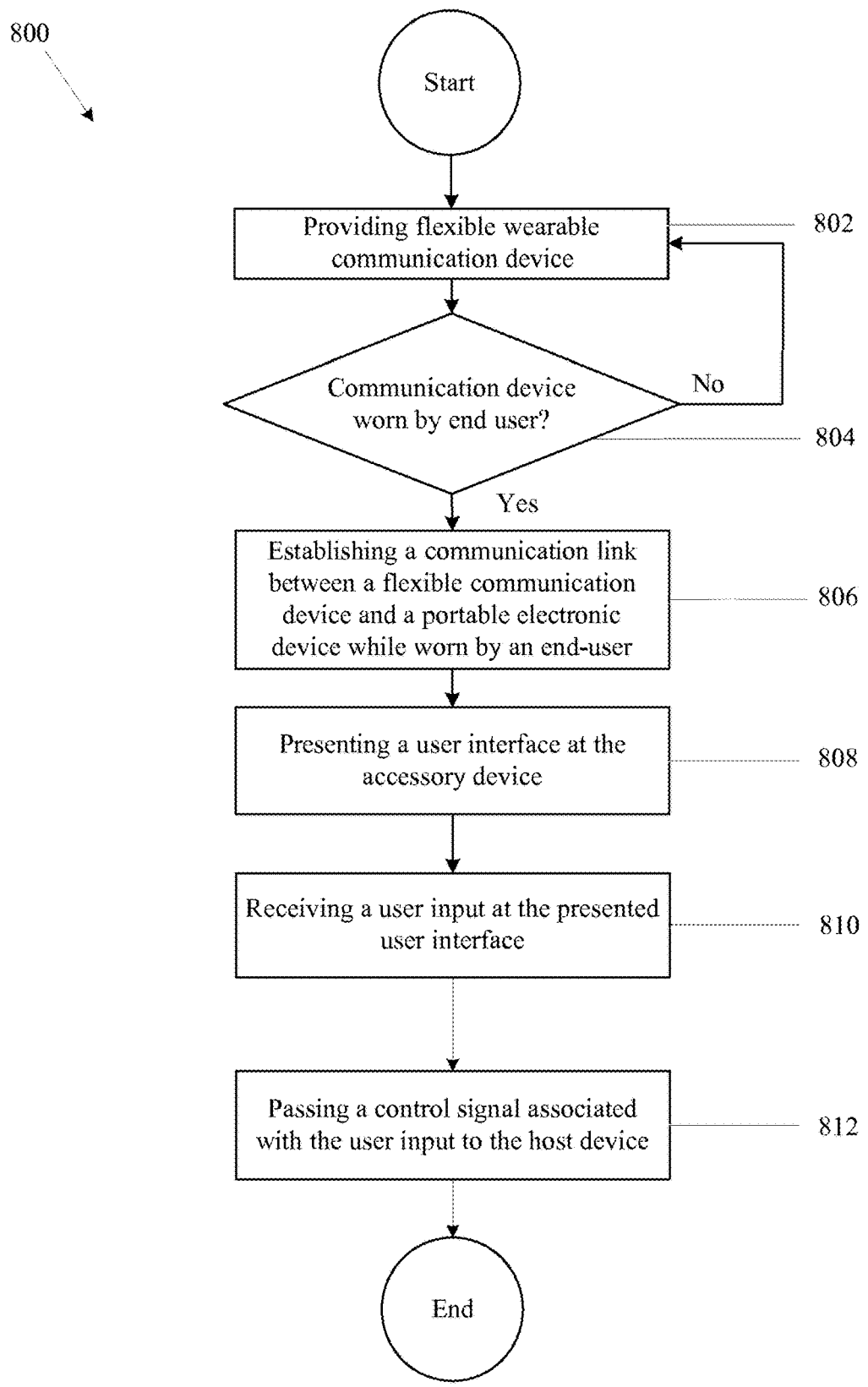
FIG. 8 shows a flow chart describing input on an accessory device which affects the operation of a host device.

FIG. 8 shows flow chart 800 describing input on a flexible wearable communication device which affects the operation of a portable electronic device. In step 802 a flexible, wearable communication device is provided. In step 804 at least one sensor is used to determine if the device is being worn. The strain gauge identified earlier could be used to determine whether the flexible wearable device is in an open or closed state. An pressure sensor can be added to determine if there were any pressure on the inside surface of the flexible wearable communication device, thereby obtaining a good indication of whether or not the device is being worn. Step 806 is reached if the device is being worn in which case a communications link is established between the flexible wearable communication device and the portable electronic device. The communication link can be established through a wireless protocol, and can be established in a single direction or in two ways for fully cooperative interaction between the devices. In step 808 a user interface is presented by the flexible wearable communication device. The user interface could be a virtual keyboard or a specialized control set designed differently for each application. In step 810 a user input is received at the user interface. In step 812 a control signal is passed from the flexible wearable communication device to the portable electronic device. The control signal could operate to store items to the host device, to manipulate the host device display, or to accomplish any other desired change in state of the portable electronic device.

Figure 9:
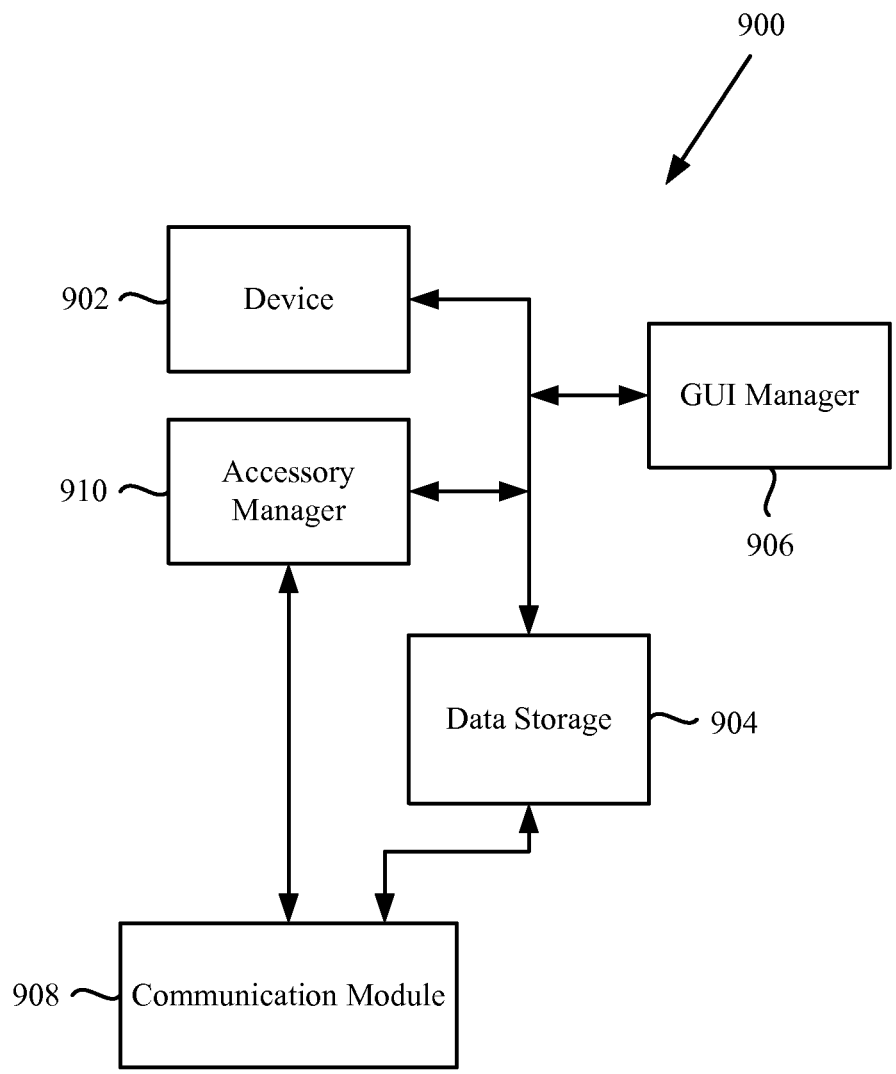
FIG. 9 shows a block diagram of an arrangement of functional modules utilized by an electronic device.

FIG. 9 is a block diagram of an arrangement 900 of functional modules utilized by an electronic device. Arrangement 900 includes an electronic device 902 that is able to output media for a user of the portable media device but also store and retrieve data with respect to data storage 904. Arrangement 900 also includes a graphical user interface (GUI) manager 906. The GUI manager 906 operates to control information being provided to and displayed on a display device. Arrangement 900 also includes a communication module 908 that facilitates communication between the portable media device and an accessory device. Still further, arrangement 900 includes an accessory manager 910 that operates to authenticate and acquire data from an accessory device that can be coupled to the portable electronic device.

Figure 10:
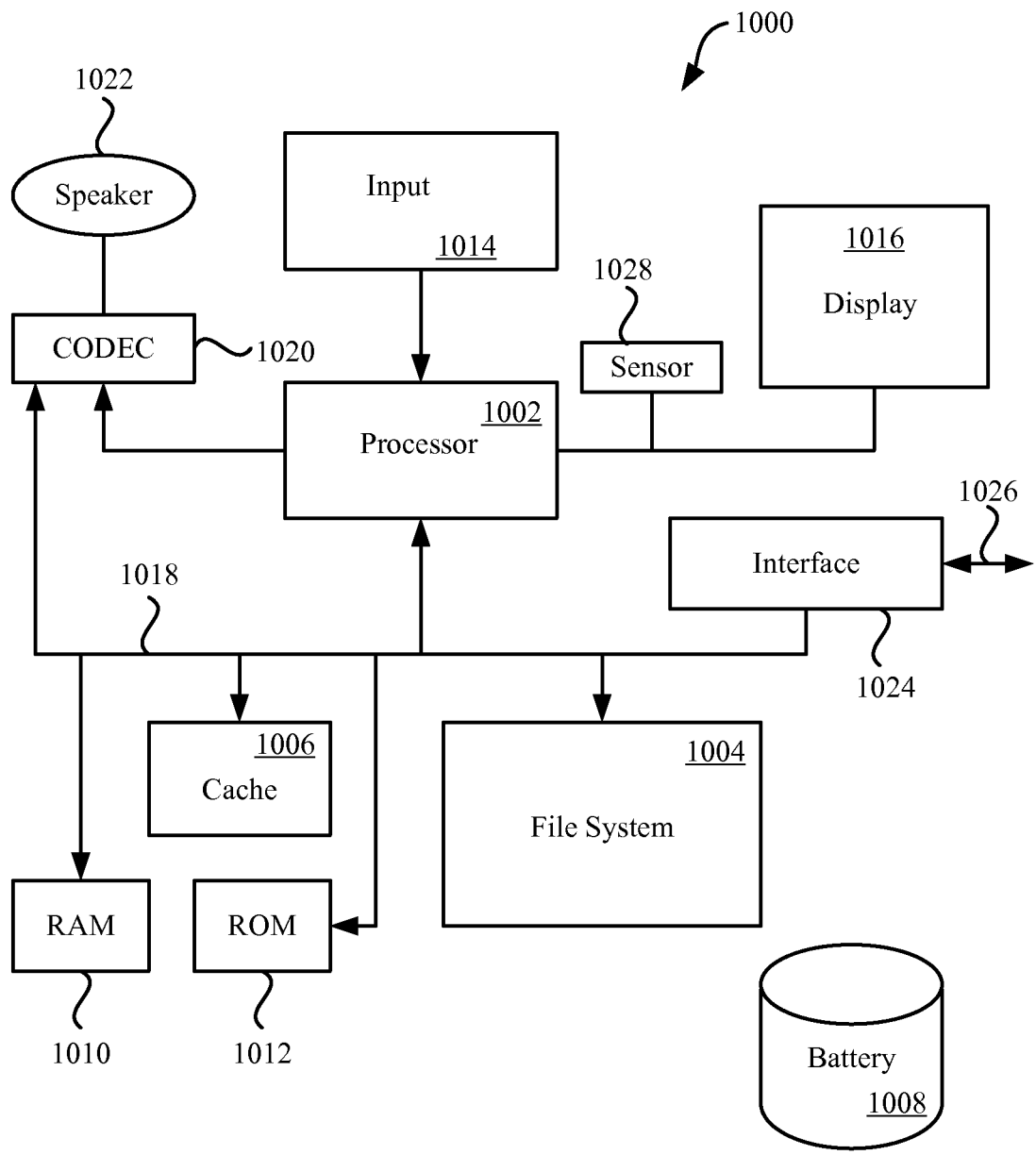
FIG. 10 shows a block diagram of an electronic device suitable for use with the described embodiments.

FIG. 10 is a block diagram of an electronic device 1000 suitable for use with the described embodiments. Electronic device 1000 illustrates circuitry of a representative computing device. Electronic device 1000 includes a processor 1002 that pertains to a microprocessor or controller for controlling the overall operation of the electronic device 1000. Electronic device 1000 stores media data pertaining to media items in a file system 1004 and a cache 1006. The file system 1004 is, typically, a storage disk or a plurality of disks. The file system 1004 typically provides high capacity storage capability for the electronic device 1000. However, since the access time to the file system 1004 is relatively slow, the electronic device 1000 can also include a cache 1006. The cache 1006 is, for example, Random-Access Memory (RAM) provided by semiconductor memory. The relative access time to the cache 1006 is substantially shorter than for the file system 1004. However, the cache 1006 does not have the large storage capacity of the file system 1004. Further, the file system 1004, when active, consumes more power than does the cache 1006. The power consumption is often a concern when the electronic device 1000 is a portable media device that is powered by a battery 1008. The electronic device 1000 can also include RAM 1010 and Read-Only Memory (ROM) 1012. The ROM 1012 can store programs, utilities or processes to be executed in a non-volatile manner. The RAM 1010 provides volatile data storage, such as for the cache 1006.

The electronic device 1000 also includes a user input device 1014 that allows a user of the electronic device 1000 to interact with the electronic device 1000. For example, the user input device 1014 can take a variety of forms, such as a button, keypad, dial, touch screen, audio input interface, visual/image capture input interface, input in the form of sensor data, etc. Still further, the electronic device 1000 includes a display 1016 (screen display) that can be controlled by the processor 1002 to display information to the user. A data bus 1018 can facilitate data transfer between at least the file system 1004, the cache 1006, the processor 1002, and the CODEC 1020.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line. The computer readable medium is any data storage device that can store data which can thereafter be read by a computer system. Examples of the computer readable medium include read-only memory, random-access memory, CD-ROMs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. An electronic device, comprising:
   a housing movable between first and second configurations;
   a first display portion in the housing that faces and is configured to emit light in a direction when the housing is in the first configuration; and
   a second display portion in the housing that faces the direction when the housing is in the first and second configurations, wherein the second display portion is covered when the housing is in the first configuration and uncovered when the housing is in the second configuration, wherein the second display portion is configured to be deactivated when covered, and wherein the second display portion is configured to emit light when uncovered.

2. The electronic device defined in claim 1, wherein the first display portion overlaps the second display portion in the first configuration.

3. The electronic device defined in claim 2, wherein the first display portion is non-overlapping with the second display portion in the second configuration.

4. The electronic device defined in claim 1, further comprising:
   capacitive elements configured to detect that the second display portion is covered in the first configuration.

5. The electronic device defined in claim 1, wherein the second display portion comprises touch sensors and the touch sensors are configured to detect that the second display portion is covered in the first configuration.

6. The electronic device defined in claim 1, wherein the second display portion comprises a flexible display.

7. The electronic device defined in claim 6, wherein the flexible display is touch sensitive.

8. The electronic device defined in claim 6, wherein the flexible display is an organic light-emitting diode display.

9. The electronic device defined in claim 1, wherein the housing comprises a curved housing portion.

10. An electronic device, comprising:
    a housing bendable between a flat state and a bent state;
    a first display portion in the housing that faces a first direction when the housing is in the flat state and faces a second direction opposite the first direction when the housing is in the bent state; and
    a second display portion in the housing that faces the first direction when the housing is in the flat state and the bent state, wherein the second display portion is configured to emit light when the housing is in the flat state, and the second display portion is configured to be deactivated when the housing is in the bent state.

11. The electronic device defined in claim 10, wherein the first display portion is configured to emit light in the first direction when the housing is in the flat state.

12. The electronic device defined in claim 10, wherein the first and second display portions form a continuous display.

13. The electronic device defined in claim 12, wherein the continuous display comprises a flexible display.

14. The electronic device defined in claim 13, wherein the flexible display is touch sensitive.

15. The electronic device defined in claim 14, wherein the flexible display comprises an organic light-emitting diode display.

16. The electronic device defined in claim 13, wherein the flexible display is coupled to the housing with an adhesive.

17. An electronic device, comprising:
- a housing;
- a first display portion in the housing that faces a first direction;
- a second display portion in the housing that faces a second direction opposite the first direction;
- a third display portion in the housing that faces a third direction different from the second direction; and
- a sensor that obtains an orientation of the electronic device, wherein the first display portion is configured to emit light when the electronic device has a first orientation, and the second and third display portions are configured to emit light while the first display portion is deactivated when the electronic device has a second orientation different from the first orientation.

18. The electronic device defined in claim 17, wherein the second and third display portions are configured to be deactivated when the electronic device has the first orientation.

19. The electronic device defined in claim 17, wherein the sensor is selected from the group consisting of: a gyroscope and an accelerometer.

20. The electronic device defined in claim 17, wherein the second and third display portions comprise a flexible display.

* * * * *